US012355773B2

(12) United States Patent
Danilychev

(10) Patent No.: US 12,355,773 B2
(45) Date of Patent: Jul. 8, 2025

(54) EXTENDED PRELAUNCH FOR LOCAL OR REMOTE PHYSICAL AND VIRTUAL SYSTEMS

(71) Applicant: Omnissa, LLC, Mountain View, CA (US)

(72) Inventor: Alex Danilychev, Irvine, CA (US)

(73) Assignee: Omnissa, LLC, Mountain View, CA (US)

( * ) Notice: Subject to any disclaimer, the term of this patent is extended or adjusted under 35 U.S.C. 154(b) by 222 days.

(21) Appl. No.: 18/154,843

(22) Filed: Jan. 15, 2023

(65) Prior Publication Data
US 2024/0244055 A1    Jul. 18, 2024

(51) Int. Cl.
| H04L 29/06 | (2006.01) |
| G06F 9/451 | (2018.01) |
| G06F 9/455 | (2018.01) |
| H04L 9/40  | (2022.01) |

(52) U.S. Cl.
CPC ............ *H04L 63/102* (2013.01); *G06F 9/452* (2018.02); *G06F 9/45558* (2013.01); *H04L 63/108* (2013.01); *G06F 2009/45595* (2013.01)

(58) Field of Classification Search
CPC . H04L 63/108; H04L 63/102; G06F 9/45558; G06F 9/452; G06F 2009/45595
See application file for complete search history.

(56) References Cited

U.S. PATENT DOCUMENTS

| 9,508,040 B2 | 11/2016 | Bilal et al. | |
| 2018/0217850 A1 * | 8/2018 | Kolesnikov | ........... G06F 3/1454 |
| 2023/0409357 A1 * | 12/2023 | He | ........... G06F 9/45558 |
| 2024/0004685 A1 * | 1/2024 | Ye | ........... G06N 20/00 |

FOREIGN PATENT DOCUMENTS

| AU | 2014302474 A1 * | 1/2016 | ............ G06F 9/452 |
| WO | WO-2016061520 A1 * | 4/2016 | ........... G06F 21/335 |
| WO | 2019217197 A1 | 11/2019 | |

OTHER PUBLICATIONS

Unknown, "Window Station and Desktop Creation", https://docs.microsoft.com/en-us/windows/win32/winstation/window-station-and-desktop-creation, Aug. 19, 2020, 2 pages.
Unknown, "CreateDesktopExA function (winuser.h)", https://docs.microsoft.com/en-us/windows/win32/api/winuser/nf-winuser-createdesktopexa, Jul. 27, 2022, 4 pages.

* cited by examiner

*Primary Examiner* — Tri M Tran
(74) *Attorney, Agent, or Firm* — Kim & Stewart LLP

(57) ABSTRACT

Prior to a user login event associated with a first user identity, a prelaunch manager determines an occurrence of a primary window prelaunch trigger condition. A primary window station is prelaunched for a first user identity at a user endpoint. Based on an occurrence of a user login event associated with the first user identity, a user session associated with the first user identity is connected with the primary window station. In some examples, the user endpoint is located remotely across a computer network from the prelaunch manager and does not require local capacity for prelaunch. In some examples, further window stations are prelaunched, nested within the primary window station, with the nested window station being associated with user identity having different privileges than the first user identity.

20 Claims, 9 Drawing Sheets

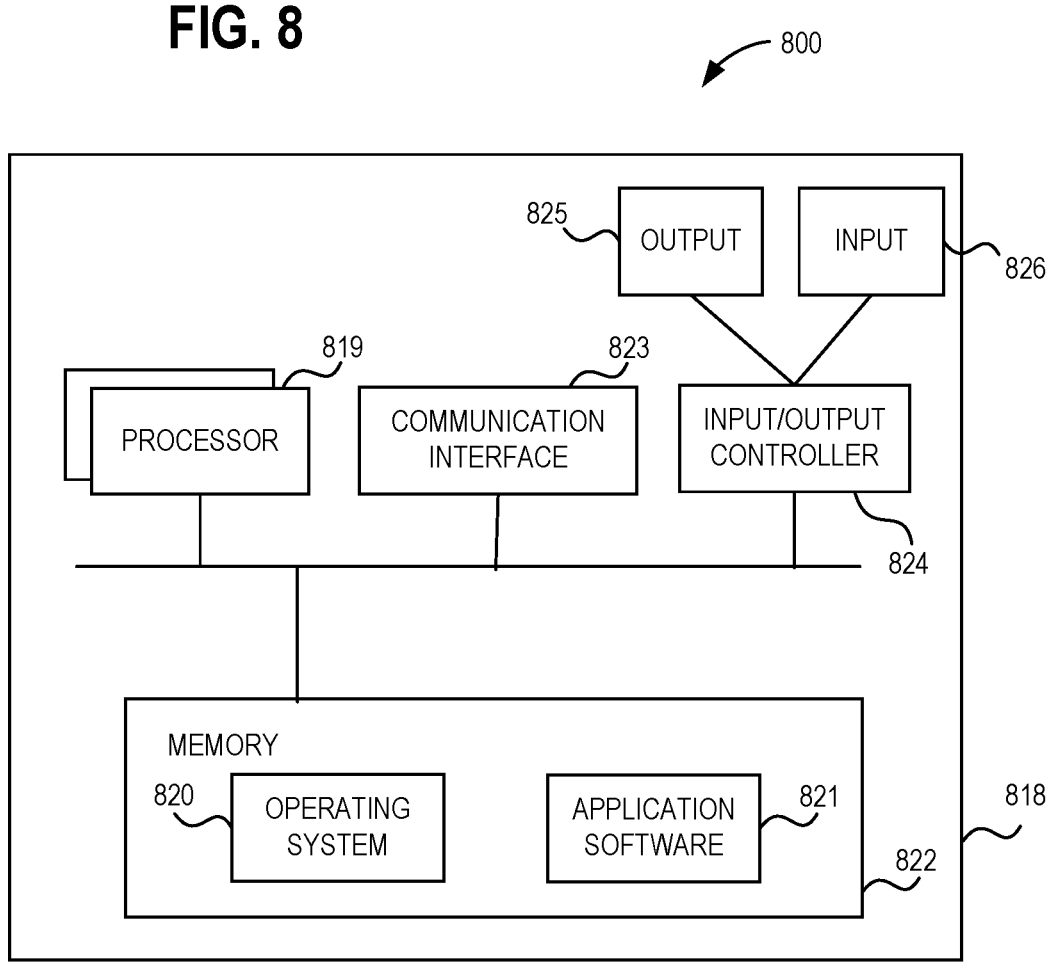

EXTENDED PRELAUNCH FOR LOCAL OR REMOTE PHYSICAL AND VIRTUAL SYSTEMS

BACKGROUND

Prelaunch is used to speed up launching of applications and user sessions by performing some tasks early to "pre-prepare" a session for a user. Traditional client-server prelaunch depends on native client software, capable of prelaunch, installed on a user endpoint. Light clients are usually lacking these capabilities and thus do not support prelaunch.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide extended prelaunch solutions for local or remote physical and virtual systems. Example solutions include: prior to a user login event associated with a first user identity, determining, by a prelaunch manager, an occurrence of a primary window station prelaunch trigger condition: based on at least determining the primary window station prelaunch trigger condition, prelaunching, for a user endpoint located remotely across a computer network from the prelaunch manager, a primary window station for the first user identity: and based on at least an occurrence of the user login event associated with the first user identity, connecting a user session associated with the first user identity with the primary window station.

Further example solutions include: prior to a user login event associated with a first user identity, determining, by a prelaunch manager, an occurrence of a primary window station prelaunch trigger condition: based on at least determining the primary window station prelaunch trigger condition, prelaunching a primary window station for the first user identity; prelaunching, by the prelaunch manager, a second window station from within the primary window station: prelaunching, by the prelaunch manager, a third window station from within the primary window station; and based on at least an occurrence of the user login event associated with the first user identity, connecting a user session associated with the first user identity with the primary window station.

BRIEF DESCRIPTION OF THE DRAWINGS

The present description will be better understood from the following detailed description read in the light of the accompanying drawings, wherein:

FIG. 8 illustrates a block diagram of an example computing apparatus that may be used as a component of example architectures such as those of FIGS. 1 and 2. Any of the figures may be combined into a single example or embodiment.

DETAILED DESCRIPTION

Figure 1:
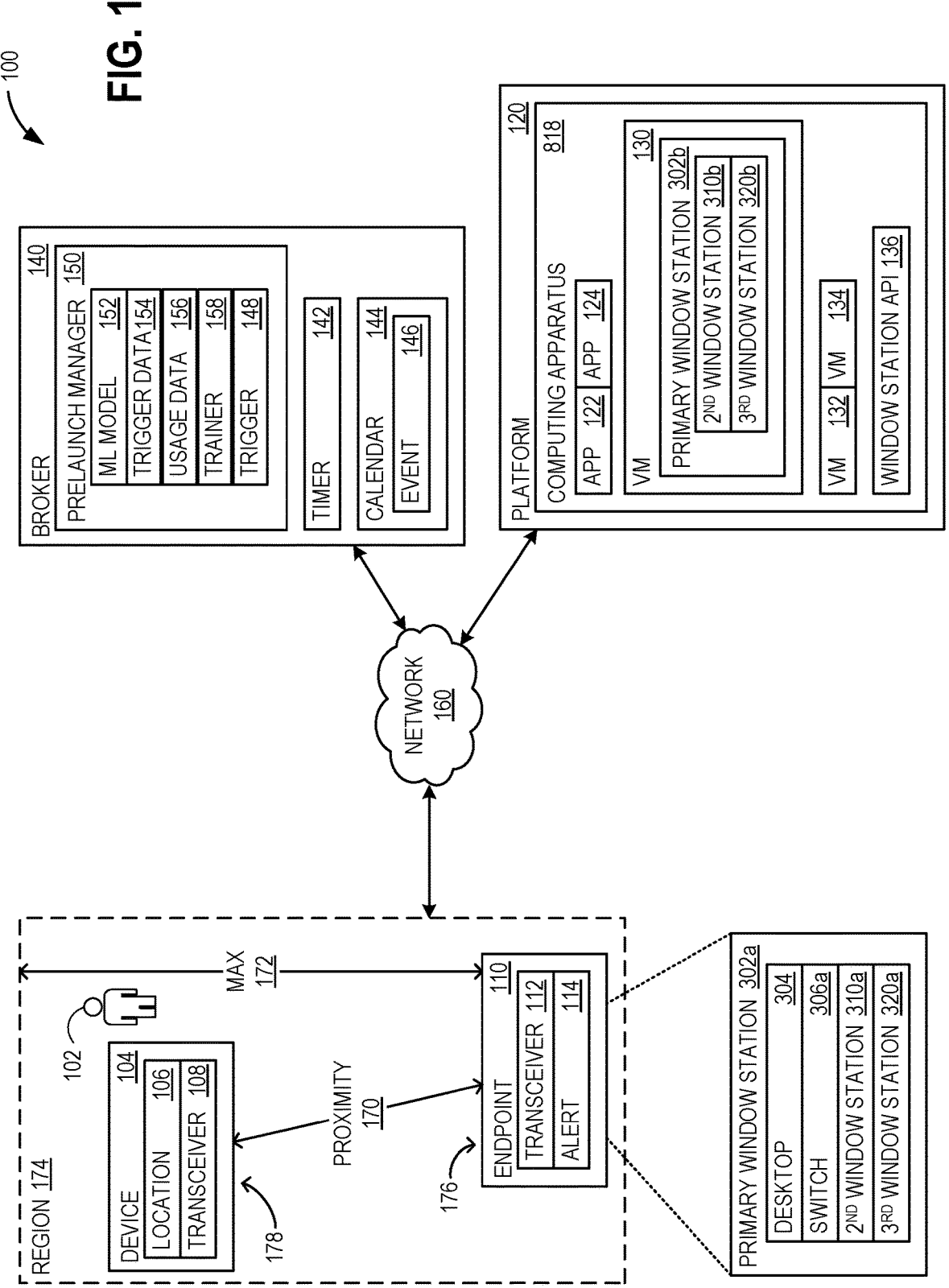
FIG. 1 illustrates an example architecture that advantageously provides extended prelaunch solutions for local or remote physical and virtual systems.

Tasks performed early in a prelaunch scenario may include resource allocation, such as memory allocation for applications and spinning up a virtual machine (VM). For systems in which a user endpoint acts as a client to a remote server, there may be other interactions that also started early. This saves start-up time for a user when compared with the user performing a cold launch of every resource to be used, and also reduces burdens on computing resources during peak usage times.

For example, after a window station has been prelaunched, when the user logs into the endpoint, the prelaunched window station is connected via a user session. A window station is a securable object that is associated with a process, and contains a clipboard, an atom table, and one or more desktop objects. A desktop is a securable object contained within a window station. When a window station is created, it is associated with the calling process and assigned to the current session.

In some scenarios, two different classes of remote sessions exist. One class delivers only applications, whereas the other also delivers desktops. Both classes deliver application windows to the associated user, and also both classes may host background processes that are not associated with any windows. When providing interactive user access, a window station is responsible for hosting single or multiple desktops that serve as containers for all windows spun by associated processes. In this context, the term "desktop" does not require a visible display that users necessarily see on a computer monitor and which hosts icons, toolbars and rectangular portions showing open application windows, but rather refers to an encompassing container, which may not be visible to the user. The term "application publishing" via remote sessions refers to delivery of application windows, created by processes started within a window station and made available to a user via the interactive remote session.

Prelaunch scenarios are often used in client-server interactions, where users connect to a remote system from a user endpoint. Remote systems are likely to be virtualized and are often associated with cloud resources deployment, connection orchestration, or both. While traditional client-server prelaunch solutions depend on native client software installed on the user endpoint, light clients without built-in prelauch capabilities do not support prelaunch.

In some prelaunch examples as described herein, prior to a user login event associated with a first user identity, a prelaunch manager determines, detects, or is otherwise notified of an occurrence of a primary winstation (window station) prelaunch trigger condition. Based on this determination, a primary window station is prelaunched for the first user identity at a first user endpoint. Based on an occurrence of the user login event associated with the first user identity, a user session associated with the first user identity is connected with the primary window station. In some examples, the user endpoint is located remotely across a computer network from the prelaunch manager and does not require local capacity for prelaunch. In some examples, further window stations are prelaunched, with sessions nested within the primary window station, with nested window station being associated with user identity having different privileges than the first user identity.

Aspects of the disclosure improve the responsiveness of computing resources by reducing user wait times to access the computing resources, thereby improving efficiency. This reduces the number of physical computing devices needed to achieve a given level of computing resource performance. This is accomplished, at least in part by, based on at least determining a primary window station prelaunch trigger condition, prelaunching a primary window station for a user endpoint. Thus, aspects of the disclosure provide a practical, useful result to solve a technical problem in the technical domain of computing.

Removing prelaunch dependency from the user endpoint enables supporting prelaunch by any client. Examples include supporting nested sessions, supporting silos, providing for fast user switching among different user identities, and enabling faster reconnect times in the event of a network interruption. Prelaunch should be established within the host itself, so that endpoint participation within the initial stage of prelaunch is no longer required. This approach also brings prelaunch capabilities to endpoint device consoles, not just remote access over a network.

Removal of endpoint dependency makes prelaunch agnostic to connectivity software at the endpoint and the connection type, allowing interoperability among different remote connectivity vendors to attach to a prelaunched environment. Direct local console access is also supported. Examples allow for both consecutive and concurrent prelaunch of different window stations.

Examples permit prelaunch with same or distinct identities for various window stations, including those that were prelaunched on the same compute node and coexist alongside the active window station. Gaining access to multiple window stations, while connecting via a console or a distinct remote session, allows for faster user switching without connectivity via a console or a distinct remote session. This is valuable to certain classes of users, such as software and website developers. Connectivity is controlled via a single path, which is easy to reconnect and manage, while a single compute instance is able to serve in place of multiple compute entities, commonly comprised of multiple virtual machines (VMs).

Upon creation, a window station is idle and in a disconnected state. When an interactive user logs on, window station is associated with the user's session, local or remote, and is activated. With respect to speed, this is similar to a reconnect operation. A desktop (or multiple distinct desktops) to display application windows is also created for the now active window station, and processes windows, if any, started by the logged-on user, are associated with particular desktop. This process is similar for both local and remote sessions. User credentials or security tokens, when supported, may be provided securely through a secure brokering system.

Prelaunch may be triggered on demand by either the user or via external automation, predicting a pending user login through user proximity tracking, user activity history, and other approaches. The prelaunch of applications and desktops is initiated simultaneously or consecutively depending on the desired balance of responsiveness and resource consumption.

This clientless prelaunch approach further enhances fast user switching by providing a remote or local user with access to multiple window stations using multiple identities, as needed. The different window stations are controlled via a single console or remote session with the ability to switch among them on demand without loss of connectivity. This reduces resource consumption by avoiding unnecessary sprawl of compute instances to host the set of window stations. For example, aspects of the disclosure reduce the quantity of required user sessions (which otherwise would have been required per each active window station), at least because the disclosed prelaunch mechanism allows users to activate window stations as needed, while reusing the existing session.

Figure 2:
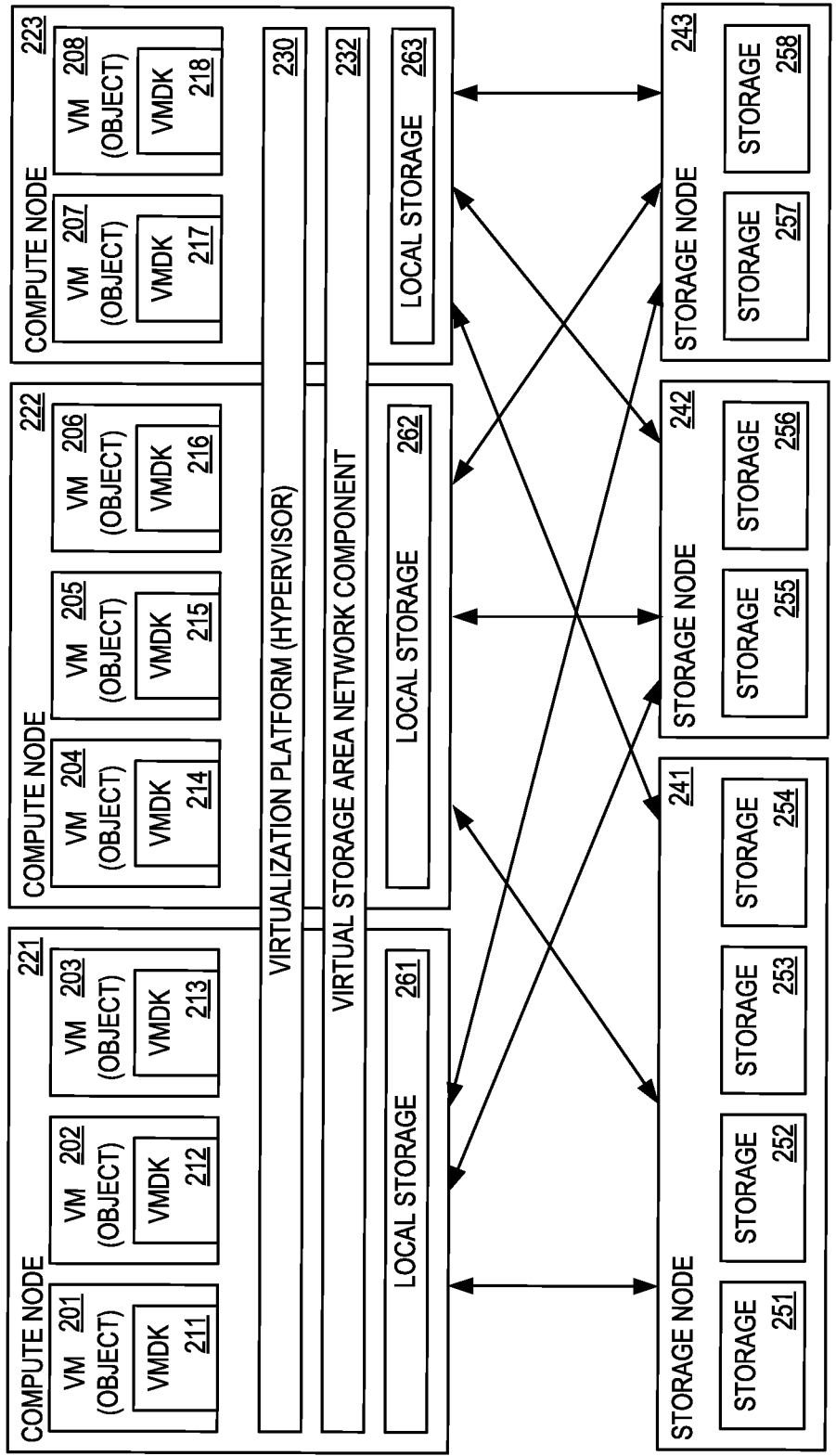
FIG. 2 illustrates further detail for an example virtualization architecture that may be used with an example architecture such as that of FIG. 1.

FIG. 1 illustrates an example architecture 100 that advantageously provides extended prelaunch solutions for local or remote physical and virtual systems. With architecture 100, a user 102 employs a user endpoint 110 as a client to access computing resources on a computing platform 120, acting in the role of a server, located remotely across a computer network 160. A broker 140 helps manage access to computing platform 120 by user endpoint 110. User endpoint 110 may be implemented on one or more computing apparatus 818 of FIG. 8, and broker 140 and computing platform 120 may be implemented on one or more computing apparatus 818 of FIG. 8, and/or using a virtualization architecture 200 as is illustrated in FIG. 2.

Broker 140 has a prelaunch manager 150 that prelaunches window stations, such as a primary window station 302, a second window station 310, and a third window station 320 (see FIG. 3) on endpoint. Prelaunch manager 150 has logic to: decide what and when to prelaunch, obtain information about user endpoint 110, track time and calendar events, know time of day, identify when user 102 is in close proximity to user endpoint 110 know location, and learn from the historical computing resource usage and times to improve predictions. Prelaunch manager 150 uses a prelaunch trigger condition 148 to determine when to prelaunch at least primary window station 302. In some examples, prelaunching is triggered on conditions such as a proximity 170 of user 102 to user endpoint 110, and/or user 102 entering a predetermined region 174.

For proximity triggers, user 102 may carry a location measurement device 104, such as a smartphone, smart watch, and the like. Multiple options may be leveraged. For one option, location measurement device 104 determines a user location 106 by using a position 178 of location measurement device 104 as a proxy. Some examples of location measurement device 104 use a global positioning system (GPS) system receiver for location determination. For example, predetermined region 174 may be defined as the area within a maximum distance 172 from a reference location 176, such as a position of user endpoint 110, or may instead have some other defined boundary (e.g., an office complex or school campus).

User location 106 is sent to broker 140 periodically and enters trigger data 154. When user 102, carrying location measurement device 104, nears user endpoint 110, user location 106 will indicate this close proximity 170. Prelaunch manager 150 determines whether user location 106 meets trigger condition 148. In some scenarios, user 102 uses location measurement device 104 to manually trigger or delay prelaunch by sending a message to broker 140.

In some examples, location measurement device 104 has a short range radio frequency (RF) transceiver 108, such as a Bluetooth™ module, and user endpoint 110 also has a short range RF transceiver 112. When RF transceivers 108 and 112 connect, a connection alert 114 is sent to broker 140 and prelaunch manager 150 determines whether connection alert 114 meets prelaunch trigger condition 148.

In some examples, prelaunching is triggered on conditions such as a calendar event 146. As illustrated, broker 140 has a calendar 144 for user 102. Calendar event 146 may be an expected workday start time for user 102, such that, if user 102 typically arrives at an office at 8 am, calendar event 146 will reflect this time and prelaunch manager 150 will have window stations 302, 310, and 320 ready for user 102 to begin productively employing user endpoint 110 when user 102 arrives as expected. In some examples, calendar event 146 includes a scheduled event other than a general workday start, such as a meeting with colleagues or customers, in which certain applications are needed (e.g., presentation software). In such examples, calendar event 146 will include not only a start time, but also computing resources needed. In some examples, calendar event 146 is included within trigger data 154. In general, trigger data 154 comprises time, event, and/or proximity data.

A common use case is that primary window station 302 connects to a remote desktop session host server or a VM-based desktop first and then accesses remote application programs from within the remote desktop session using window stations 310 and 320. This creates a nested session arrangement.

In some examples, prelaunch manager 150 employs a machine learning (ML) model 152. As used herein, ML includes artificial intelligence (AI). ML model 152 intelligently evaluates trigger data 154 against prelaunch trigger condition 148 and determines when and which window stations to prelaunch. Prelaunch manager 150 collects and monitors which computing resources are used, and when, and stores this as computing resource usage data 156. A trainer 158 provides ongoing training of ML model 152 using computing resource usage data 156 in conjunction with trigger data 154 to determine whether prelaunch trigger condition 148 should be adjusted.

A timer 142 is used to close down unused prelaunched window stations when prelaunch manager 150 has decided incorrectly to prelaunch one or more window stations unnecessarily. Although remote control prelaunching has been described thus far, in some examples, prelaunching may be local, with prelaunch manager 150 and other functionality described for broker 140 residing on user endpoint 110.

User endpoint 110, when made ready for user 102 by prelaunch manager 150 has a local primary window station component 302a, and within local primary window station component 302a, a primary desktop 304, a local second window station component 310a, and a local third window station component 320a. A local session switching component 306a enables user 102 to switch among window stations 302, 310, and 320. Traditional virtual desktop infrastructure (VDI) instances are single user systems and thus only one window station is active at a time, where "active" means a state in which a user is able to interact with the window station by being connected to that window station through a session, local or remote. A child session is an exception, when a child window station is connected through an internal session mechanism to the parent window station. Both window stations may be active in this scenario.

Modern operating systems such as Microsoft Windows allow users to switch between different user identity scopes without quitting applications and logging out. The use of concurrent window stations within the same compute instance, embraces this behavior, as described below in relation to FIG. 3. When multiple window stations coexist concurrently on the same system, concurrent connection to multiple window stations requires corresponding sessions that connect user 102 to these window stations with their associated desktops and applications. In some examples, user sessions, providing access to different window stations, may be nested. However, in some examples, window stations may typically be nested when one window station is virtualized within the scope of another (parent) window station.

Local session switching component 306a includes functionality on user endpoint 110 that receives selections from user 102 to control fast user switching. Window sessions that are inactive or disconnected from user interactivity do not preclude application execution that is otherwise are accessible through the window station. Rather, the inactive or disconnected window stations lack interactive capabilities until user 102 connects a session to that window station, making it active again.

Figure 3:
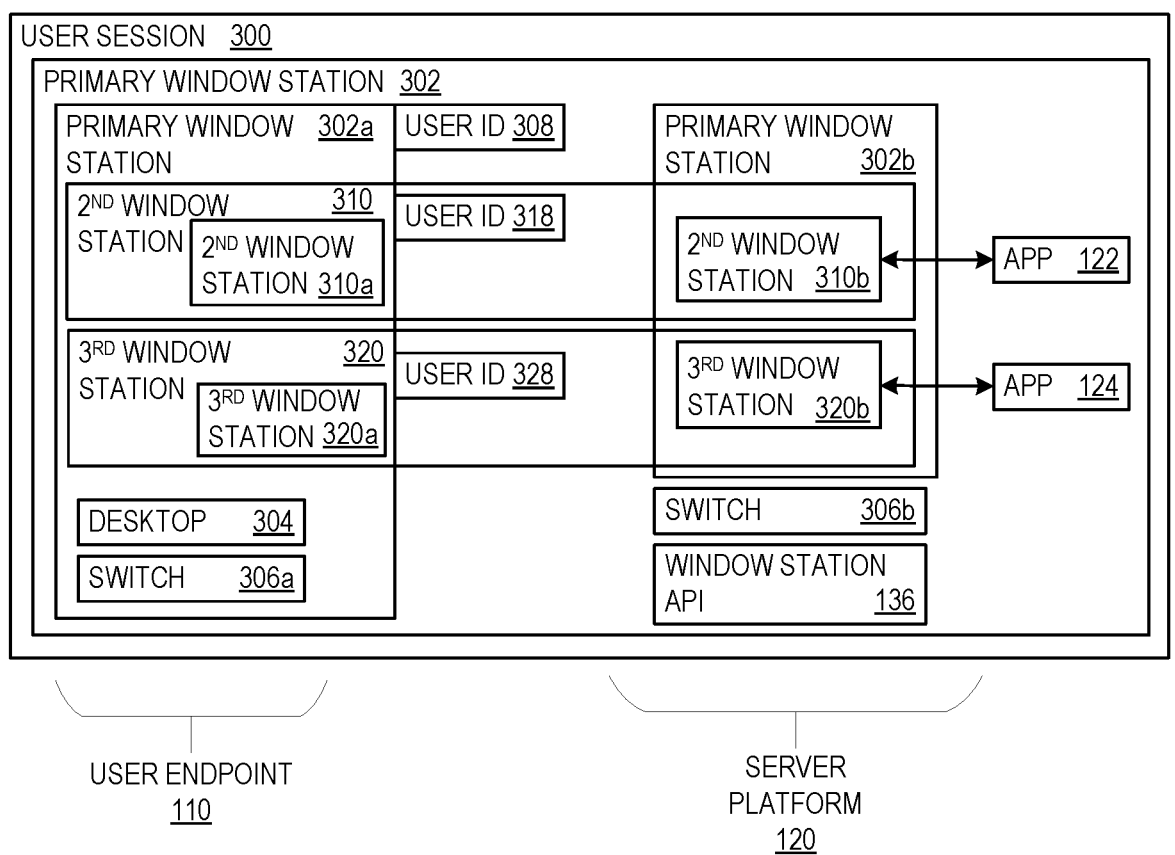
FIG. 3 illustrates a notional view of a user session that may be generated by an example architecture such as that of FIG. 1.

Computing platform 120 has the remote window station components, such as a remote primary window station component 302b, a remote second window station component 310b, and a remote third window station component 320b. As shown in FIG. 3 and described below, primary window station 302 comprises local primary window station component 302a and remote primary window station component 302b: second window station 310 comprises local second window station component 310a and remote second window station component 310b: and third window station 320 comprises local third window station component 320a and remote third window station component 320b. A window station application programming interface (API) 136 creates the window stations and allows interactions, such as opening (running), connecting, enumerating, and switching.

Primary window station 302 is the main usage environment for user 102, while second window station 310 and third window station 320 provide access to specific computing resources. For example, second window station 310 is used to access application 122 and third window station 320 is used to access application 124. Application 122 may be a word processing, spreadsheet, email, or other office suite software application, while application 124 may be an image, audio, or video editing software application. Second window station 310 and third window station 320 are nested within primary window station 302. This provides a beneficial result in that, if there are communication interruptions between user endpoint and computing platform 120 that disrupt window stations 302, 310, and 320, when primary window station 302 is restored, window stations 310 and 320 will be restored automatically, in some examples.

As illustrated, all of window stations 302, 310, and 320 are hosted by a single VM 130 executing on a single physical computing apparatus 818. In some examples, a single computing apparatus 818 is capable of hosting multiple VMs, including VM 130, a VM 132, and a VM 134. VM 130 and VM 132 may each also host multiple window stations. In general, a single VM being heavily taxed by running multiple window stations is more resource-efficient than multiple VMs running a single window station each. In some examples, computing platform 120 is instead implemented using virtualization architecture 200 of FIG. 2.

Although a dispersed arrangement is shown, with user endpoint 110 and computing platform 120 physically separated by computer network 160, in some examples, the window stations and computing resources are local to user endpoint 110. For example, the window stations and computing resources are within user endpoint 110. It should also be understood that although three window stations are used in the examples described herein, a different number of window stations may be used in some examples. Additionally, although a virtualized environment is illustrated, it should be understood that examples may instead be implemented using only stand-alone or networked physical systems.

Examples of architecture 100 are operable with virtualized and non-virtualized storage solutions. FIG. 2 illustrates virtualization architecture 200 that may be used as a version of computing platform 120. Virtualization architecture 200 is comprised of a set of compute nodes 221-223, interconnected with each other and a set of storage nodes 241-243 according to an embodiment. In other examples, a different number of compute nodes and storage nodes may be used. Each compute node hosts multiple objects, which may be virtual machines (VMs, such as base objects, linked clones, and independent clones), containers, applications, or any compute entity (e.g., computing instance or virtualized computing instance) that consumes storage. When objects are created, they may be designated as global or local, and the designation is stored in an attribute. For example, compute node 221 hosts objects 201, 202, and 203; compute node 222 hosts objects 204, 205, and 206; and compute node 223 hosts objects 207 and 208. Some of objects 201-208 may be local objects. In some examples, a single compute node may host 50, 100, or a different number of objects. Each object uses a VM disk (VMDK), for example VMDKs 211-218 for each of objects 201-208, respectively. Other implementations using different formats are also possible. A virtualization platform 230, which includes hypervisor functionality at one or more of compute nodes 221, 222, and 223, manages objects 201-208. In some examples, various components of virtualization architecture 200, for example compute nodes 221, 222, and 223, and storage nodes 241, 242, and 243 are implemented using one or more computing apparatus such as computing apparatus 818 of FIG. 8.

Virtualization software that provides software-defined storage (SDS), by pooling storage nodes across a cluster, creates a distributed, shared data store, for example a storage area network (SAN). Thus, objects 201-208 may be virtual SAN (vSAN) objects. In some distributed arrangements, servers are distinguished as compute nodes (e.g., compute nodes 221, 222, and 223) and storage nodes (e.g., storage nodes 241, 242, and 243). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. Storage nodes 241-243 each include multiple physical storage components, which may include flash, SSD, NVMe, PMEM, and QLC storage solutions. For example, storage node 241 has storage 251, 252, 252, and 254: storage node 242 has storage 255 and 256: and storage node 243 has storage 257 and 258. In some examples, a single storage node may include a different number of physical storage components.

In the described examples, storage nodes 241-243 are treated as a SAN with a single global object, enabling any of objects 201-208 to write to and read from any of storage 251-258 using a virtual SAN component 232. Virtual SAN component 232 executes in compute nodes 221-223. Using the disclosure, compute nodes 221-223 are able to operate with a wide range of storage options. In some examples, compute nodes 221-223 each include a manifestation of virtualization platform 230 and virtual SAN component 232. Virtualization platform 230 manages the generating, operations, and clean-up of objects 201 and 202. Virtual SAN component 232 permits objects 201 and 202 to write incoming data from object 201 and incoming data from object 202 to storage nodes 241, 242, and/or 243, in part, by virtualizing the physical storage components of the storage nodes.

FIG. 3 illustrates a notional view of a user session 300 that may be generated by examples of architecture 100. A user session is an encounter between a user and a computing resource, such as a computer or a software application, between a start time and a quit time. User session 300 has a nested arrangement of primary window station 302 with second window station 310 and third window station 320 within primary window station 302. Each of window stations 302, 310, and 320 has a local component on user endpoint 110, which is in the role of client, and a remote component on computing platform 120, which is in the role of server.

For primary window station 302, local primary window station component 302a and primary desktop 304 are on user endpoint 110 and remote primary window station component 302b is on computing platform 120. For second window station 310, local second window station component 310a is on user endpoint 110 and remote second window station component 310b is on computing platform 120. For third window station 320, local third window station component 320a is on user endpoint 110 and remote third window station component 320b is on computing platform 120. Window stations 310 and 320 also have desktops, in some examples.

Window station API 136 is hosted by computing platform 120, which also hosts applications 122 and 124. Remote second window station component 310b executes, and remote third window station component 320b executes application 124. Fast user switching among window stations 302, 310, and 320 is provides by window station API 136 via remote session switching component 306b on computing platform 120, and local session switching component 306a accepting user input on user endpoint 110.

Primary window station 302 is associated with a user identity 308, second window station 310 is associated with a user identity 318, and third window station 320 is associated with a user identity 328. In some examples, one or both of user identities 318 and 328 are the same as user identity 308. In some examples, user identities 308, 318, and 328 are all different. For example, user identity 308 has the highest privilege level, and user identities 318 and/or 328 have lower privilege levels. This scenario may occur when user identity 308 is a software developer who needs special user privileges, and user identities 318 and 328 are used for testing whether users with lower privilege levels (e.g., non-administrative regular user and guest account) will be able to properly execute the software being developed.

The different window stations provide isolation for executing applications, so that a problem occurring within one window station does not adversely impact the other window stations. This permits a single-user endpoint to emulate a multi-user system by supporting single user with multiple user identities in a single session, allowing access to multiple window stations, rather than requiring separate sessions.

In some examples, each of window stations 310 and 320, nested within primary window station 302, is a full window station rather than a sandbox or a child session, and may have further nested window stations within it. A sandbox is an isolated testing environment that enables users to run programs or open files without affecting the application, system or platform on which they run. A child session is a session within a window station that has limited function, such as Android platform emulator.

After primary window station 302 is prelaunched, window stations 310 and 320 may be prelaunched either concurrently or consecutively. When multiple window stations are launched within a single compute environment, the number of active window stations are constrained by the nature of the system, whether it is a single or a multi-user system. Concurrent prelaunching of window stations 310 and 320 may be preferable for speed when application 122, accessed by second window station 310, and application 124, accessed by third window station 320, are in different silos associated with different user identities. This is because a prelaunch failure of second window station 310 has limited value in predicting a failure of prelaunching third window station 320.

However, when applications 122 and 124 are in the same silo and associated with the same user identity, a prelaunching failure for second window station 310 is an indicator that an attempt to prelaunch third window station 320 will also fail. This may occur, for example, if user identity 318 does not have permission to access application 122. In this case, user identity 328 is unlikely to have permission to access application 124 because, in this scenario, user identities 318 and 320 are the same. Consecutive prelaunching is used to minimize wasting resources, because resources that would be used to prelaunch third window station 320 are not burdened with a predictable failure.

Figure 4:
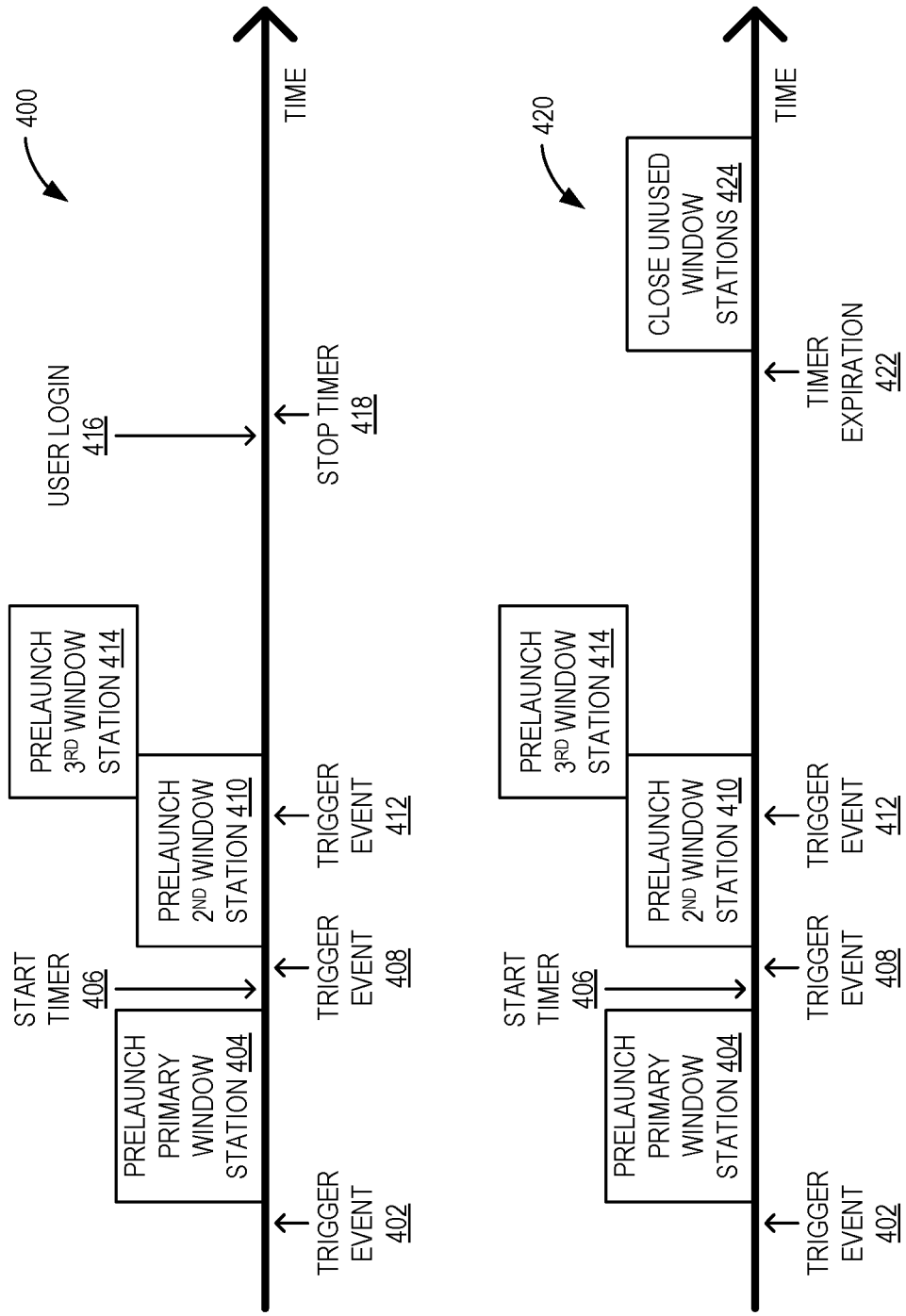
FIG. 4 illustrates a timeline of events that may occur when using an example architecture such as that of FIG. 1.

FIG. 4 illustrates a first timeline 400 of events that may occur during concurrent prelaunching of window stations 310 and 320. A trigger event 402, based on broker 140 detecting an occurrence of trigger condition 148 for prelaunching primary window station 302. Prelaunching of primary window station 302 occurs during a time period 404. Timer 142 is started as a countdown timer for determining when to close down at least primary window station 302, if user 102 does not log in soon enough.

In some scenarios, trigger event 402 triggers prelaunching of all window stations 302, 310, and 320. In some scenarios, trigger event 402 triggers prelaunching only primary window station 302 and one or more other trigger conditions are used for triggering prelaunching of window stations 310 and 320. A trigger event 408 for second window station 310 and a trigger event 412 for third window station 320 are both shown.

Prelaunching of second window station 310 occurs during a time period 410, and prelaunching of third window station 320 occurs during a time period 414. Because prelaunching of third window station 320 does not depend upon the successful completion of the prelaunching of second window station 310, and starts during time period 414, time periods 410 and 414 overlap and the prelaunching events are concurrent.

Upon completion of time period 414, window stations 302, 310, and 320 are idle, and in a non-connected state, waiting for a user login event 416. Upon detecting the occurrence of user login event 416, primary window station 302 is connected to user session 300 and comes out of its idle state, and broker 140 stops timer 142 at a timer abort event 418.

FIG. 4 also illustrates an alternate timeline 420 in which user login event 416 does not occur prior to expiration of timer 142 at a timer expiration event 422. Upon timer expiration event 422, broker 140 closes down all unused window stations, which in the illustrated scenario are all of window stations 302, 310, and 320. Closing window stations 302, 310, and 320 occurs during a time period 424. In some examples, window stations 310 and 320 each has its own timer such that user 102 logging in soon enough prevents broker 140 from automating closing primary window station 302, but not window stations 310 and 320.

Figure 5:
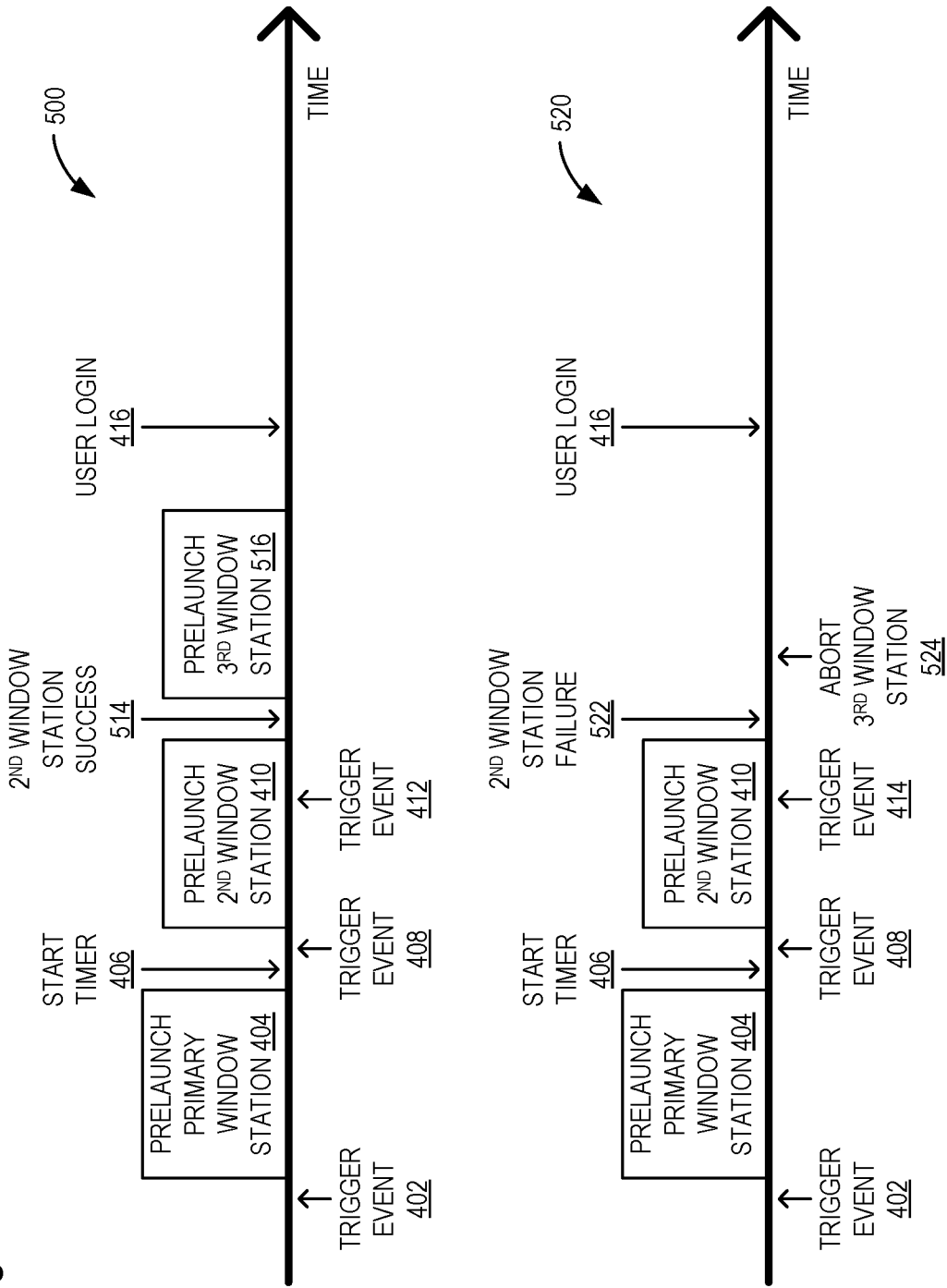
FIG. 5 illustrates another timeline of events that may occur when using an example architecture such as that of FIG. 1.

FIG. 5 illustrates a first timeline 500 of events that may occur during consecutive prelaunching. Events 402, 406, 408, 412, and 416 are as described for FIG. 4, as are time periods 404 and 410. However, in timeline 500, prelaunching of third window station 320 waits until prelaunching of second window station 310 has been determined to be successful, at an event 514. Prelaunching of third window station 320 occurs during a time period 516. Because prelaunching of third window station 320 depends upon the successful prelaunching of second window station 310, and time periods 410 and 516 do not overlap, the prelaunching events are consecutive.

FIG. 5 also illustrates an alternate timeline 520 in which prelaunching of second window station 310 has been determined to be a failure, at an event 522. Prelaunching of third window station 320 is aborted at an abort event 524. The possibility of closing down unused window stations upon a timer expiration, described for FIG. 4 carries over to consecutive prelaunching.

Figure 6:
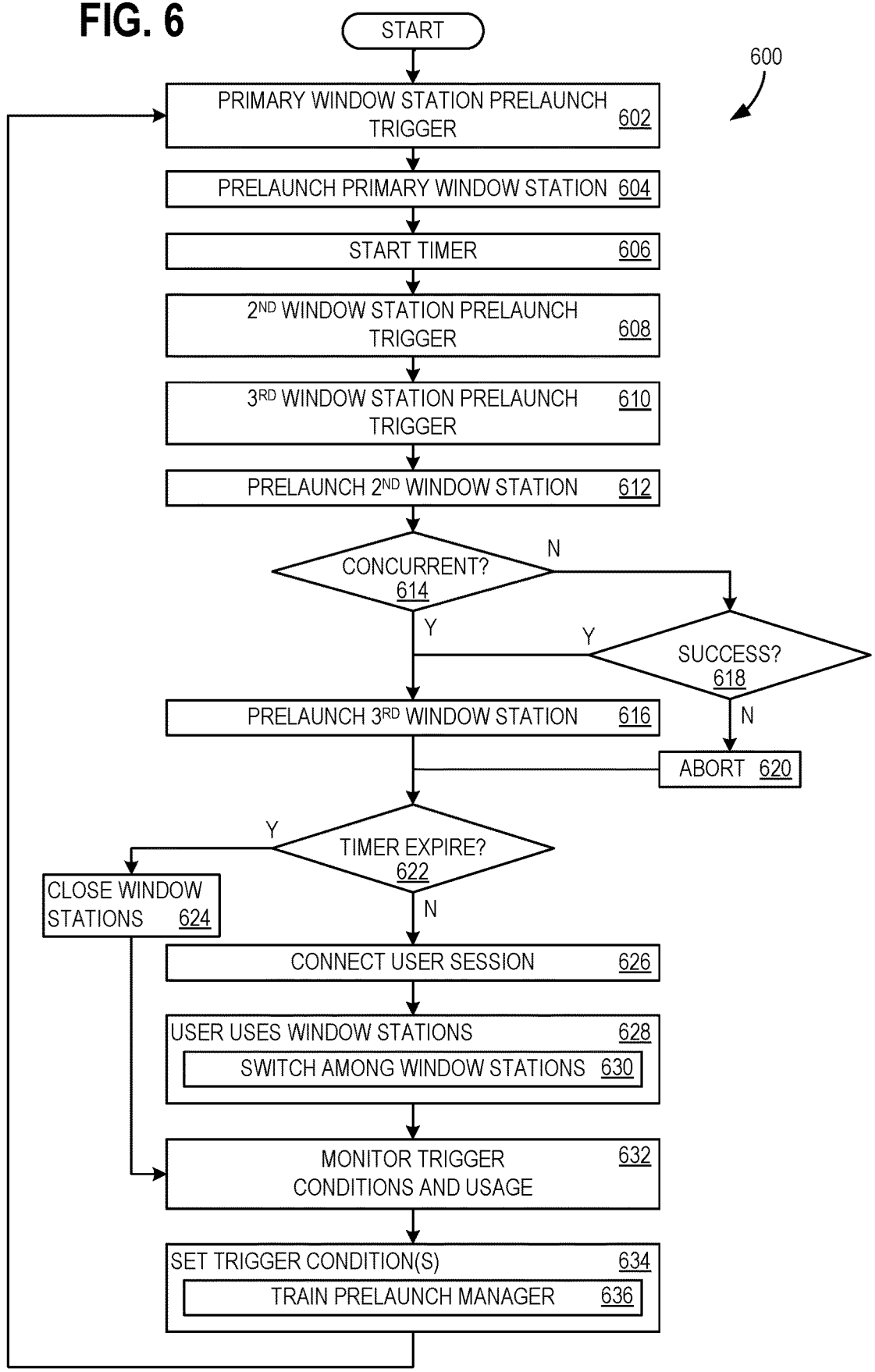
FIG. 6 illustrates a flowchart of exemplary operations associated with an example architecture such as that of FIG. 1.

FIG. 6 illustrates a flowchart 600 of exemplary operations associated with architecture 100. In some examples, the operations of flowchart 600 are performed by one or more computing apparatus 818 of FIG. 8. Flowchart 600 commences with prelaunch manager 150 an occurrence of (primary window) prelaunch trigger condition 148 at trigger event 402, in operation 602. In some examples, prelaunch manager 150 comprises ML model 152. In some examples, prelaunch trigger condition 148 comprises calendar event 146 or a proximity condition. In some examples, calendar event 146 comprises a workday start or a scheduled appointment. In some examples, the proximity condition comprises a connection event for a short range communication system or detection of user location 106 within predetermined region 174. In some examples, predetermined region 174 is at least partially defined by maximum distance 172 from reference location 176.

In operation 604, based on at least determining primary window prelaunch trigger condition 148, prelaunch manager 150 prelaunches primary window station 302 for user identity 308 for user endpoint 110. In some examples, user endpoint 110 is located remotely across computer network 160 from prelaunch manager 150. In some examples, user endpoint 110 lacks functionality to initiate the prelaunch of primary window station 302, second window station 310, and/or third window station 320. In some examples, prelaunch manager 150 is located on user endpoint 110. Timer 142 is started in operation 606.

In some examples, in which different triggers are used for the different window stations, operation 608 determines an occurrence of a second window prelaunch trigger condition and operation 610 determines an occurrence of a third window prelaunch trigger condition. In some examples, prelaunch trigger condition 148 is used as the trigger for multiple window stations, such as all of window stations 302, 310, and 320, and operation 608 and 610 are not used.

Prelaunch manager 150 prelaunches second window station 310 from within primary window station 302 in operation 612. In some examples, second window station 310 is associated with application 122 and/or is associated with a user identity. User identity 318, associated with second window station 310, may either be user identity 308 (e.g., the same as user identity 308) or different than user identity 308. In some examples, user identity 318 has a different privilege level than user identity 308.

A decision operation 614 determines whether prelaunching of window stations 310 and 320 will be concurrent or consecutive. With concurrent prelaunching, the prelaunching of third window station 320 does not depend upon successfully prelaunching second window station 310. If concurrent, flowchart 600 enters operation 616 without waiting for an indication that prelaunching second window station 310 was successful, and prelaunch manager 150 prelaunches third window station 320 within primary window station 302. In some examples, third window station 320 is associated with application 124 and/or is associated with a user identity. User identity 328, associated with third window station 320, may either be user identity 308 (e.g., the same as user identity 308) or different than user identity 308. In some examples, user identity 328 has a different privilege level than user identity 308.

If, however, prelaunching third window station 320 depends upon successfully prelaunching second window station 310, the prelaunching is consecutive. Decision operation 618 determines whether prelaunching of second window station 310 is successful. If not, prelaunching of third window station 320 is aborted at 620 and then flowchart 600 moves to decision operation 622. Otherwise, if prelaunching of second window station 310 is successful, flowchart moves to operation 616 to prelaunch third window station 320.

In some scenarios, consecutive prelaunching may be used to avoid overly-burdening computing platform 120, rather than applications 122 and 124 being in the same silo, and decision operation is skipped in favor of a short delay before flowchart moves from decision operation 614 to operation 616.

Decision operation 622 determines whether user login event 416, associated with user identity 308, has occurred prior to timer expiration event 422. In some examples, prelaunching second window station 310 and prelaunching third window station 320 also occur prior to user login event 416. If user login event 416 has not occurred in time, operation 624 closes unconnected (unused) prelaunched window stations and then flowchart 600 moves to operation 632.

If, however, user login event 416 does occur prior to timer expiration event 422, user session 300 is connected with primary window station 302, in operation 626. User session 300 and primary window station 302 are associated with user identity 308. User 102 uses primary window station 302, with user identity 308, in operation 628. During operation 628, user 102 is able to switch an active window station among primary window station 302, second window station 310, and third window station 320 as operation 630.

Broker 140 performs ongoing monitoring of times, events, and/or proximity conditions associated with computing resource usage (usage data 156) in operation 632. In operation 634, broker 140 sets or adjusts prelaunch trigger condition 148 or another prelaunch trigger condition (if more than one is used) for a window station, based on at least the monitoring of operation 632. In some examples, setting a prelaunch trigger condition comprises trainer 158 training Ml model 152 of prelaunch manager 150 In operation 636, based on at least the monitoring of operation 632.

Figure 7A:
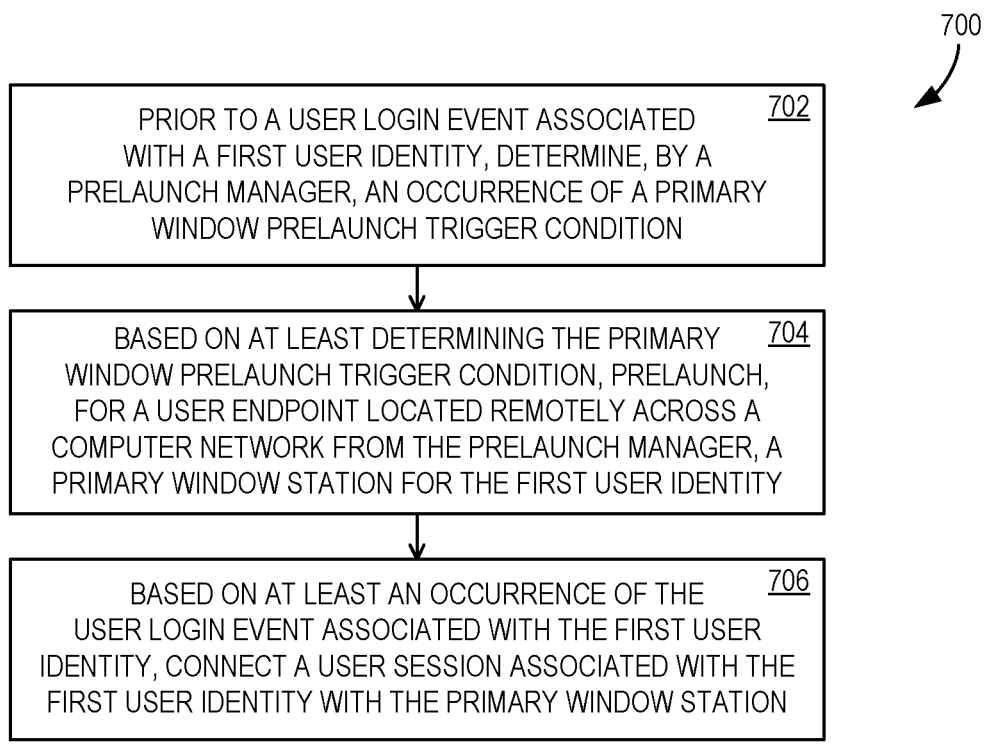
FIGS. 7A and 7B illustrate additional flowcharts of exemplary operations associated with an example architecture such as that of FIG. 1.

FIG. 7A illustrates a flowchart 700 of exemplary operations associated with examples of architecture 100. In some examples, the operations of flowchart 700 are performed by one or more computing apparatus 818 of FIG. 8. Flowchart 700 commences with operation 702, which includes, prior to a user login event associated with a first user identity, determining, by a prelaunch manager, an occurrence of a primary window prelaunch trigger condition.

Operation 704 includes, based on at least determining the primary window prelaunch trigger condition, prelaunching, for a user endpoint located remotely across a computer network from the prelaunch manager, a primary window station for the first user identity. Operation 706 includes, based on at least an occurrence of the user login event associated with the first user identity, connecting a user session associated with the first user identity with the primary window station.

Figure 7B:
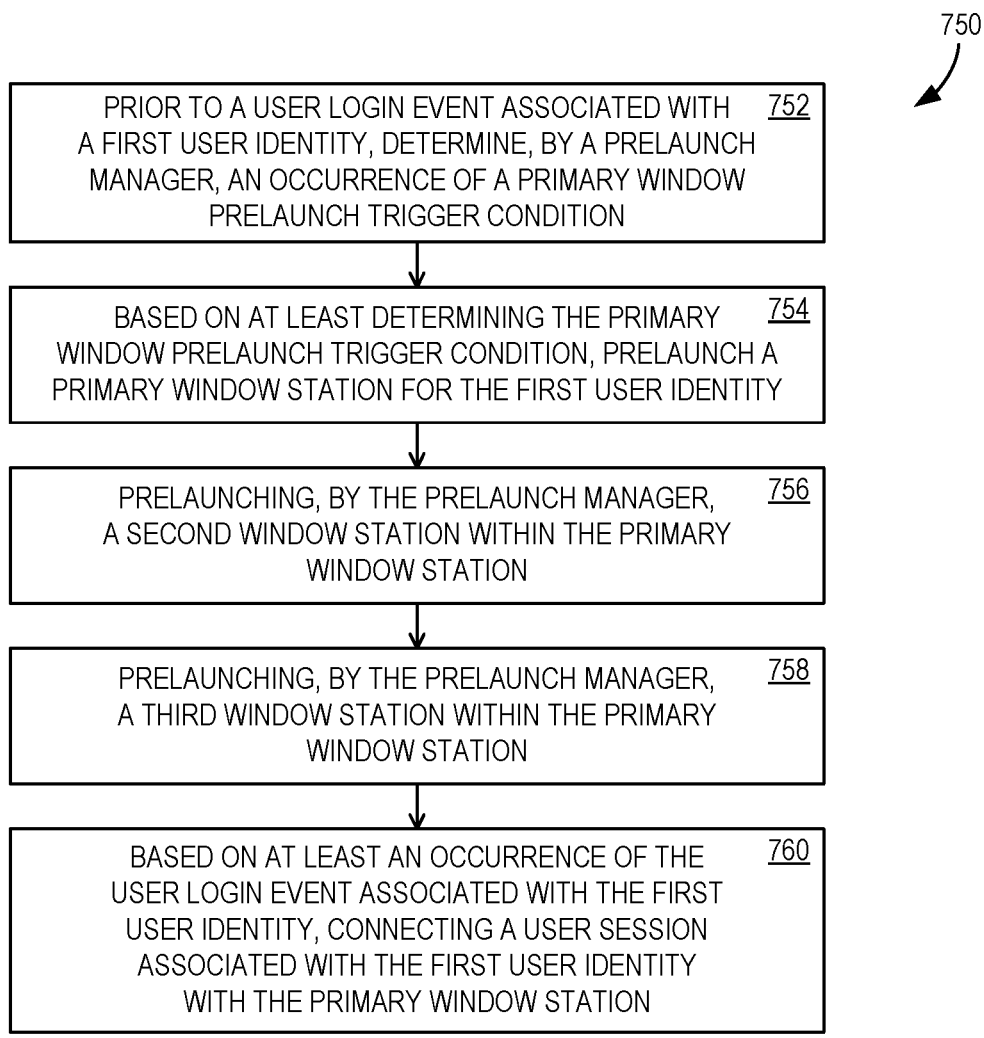

FIG. 7B illustrates a flowchart 750 of exemplary operations associated with examples of architecture 100. In some examples, the operations of flowchart 750 are performed by one or more computing apparatus 818 of FIG. 8. Flowchart 750 commences with operation 752, which includes prior to a user login event associated with a first user identity, determining, by a prelaunch manager, an occurrence of a primary window prelaunch trigger condition.

Operation 754 includes, based on at least determining the primary window prelaunch trigger condition, prelaunching a primary window station for the first user identity. Operation 756 includes prelaunching, by the prelaunch manager, a second window station within the primary window station. Operation 758 includes prelaunching, by the prelaunch manager, a third window station within the primary window station. Operation 760 includes, based on at least an occurrence of the user login event associated with the first user identity, connecting a user session associated with the first user identity with the primary window station.

Additional Examples

An example method of providing a window station comprises: prior to a user login event associated with a first user identity, determining, by a prelaunch manager, an occurrence of a primary window station prelaunch trigger condition: based on at least determining the primary window station prelaunch trigger condition, prelaunching, for a user endpoint located remotely across a computer network from the prelaunch manager, a primary window station for the first user identity: and based on at least an occurrence of the user login event associated with the first user identity, connecting a user session associated with the first user identity with the primary window station.

An example computer system comprises: a processor: and a non-transitory computer readable medium having stored thereon program code executable by the processor, the program code causing the processor to: prior to a user login event associated with a first user identity, determine, by a prelaunch manager, an occurrence of a primary window prelaunch trigger condition: based on at least determining the primary window prelaunch trigger condition, prelaunch, for a user endpoint located remotely across a computer network from the prelaunch manager, a primary window station for the first user identity: and based on at least an occurrence of the user login event associated with the first user identity, connect a user session associated with the first user identity with the primary window station.

An example non-transitory computer storage medium has stored thereon program code executable by a processor, the program code embodying a method comprising: prior to a user login event associated with a first user identity, determining, by a prelaunch manager, an occurrence of a primary window prelaunch trigger condition: based on at least determining the primary window prelaunch trigger condition, prelaunching, for a user endpoint located remotely across a computer network from the prelaunch manager, a primary window station for the first user identity: and based on at least an occurrence of the user login event associated with the first user identity, connecting a user session associated with the first user identity with the primary window station.

Another example method of providing a window station comprises: prior to a user login event associated with a first user identity, determining, by a prelaunch manager, an occurrence of a primary window station prelaunch trigger condition: based on at least determining the primary window station prelaunch trigger condition, prelaunching a primary window station for the first user identity: prelaunching, by the prelaunch manager, a second window station within the primary window station: prelaunching, by the prelaunch manager, a third window station within the primary window station: and based on at least an occurrence of the user login event associated with the first user identity, connecting a user session associated with the first user identity with the primary window station.

Alternatively, or in addition to the other examples described herein, examples include any combination of the following:

- the prelaunch trigger condition comprises a calendar event or a proximity condition;
- prelaunching, by the prelaunch manager, a second window station within the primary window station;
- prelaunching, by the prelaunch manager, a third window station from within the primary window station;
- switching from an active window station to the second window station, the third window station, etc.;
- prelaunching the second window station and prelaunching the third window station occurs concurrently, such that prelaunching the third window station does not depend upon successfully prelaunching the second window station;
- the primary window station, the second window station, and the third window station are all hosted by a common VM;
- determining whether the user login event associated with the first user identity has occurred prior to a timer expiration event;
- based on at least determining that a user login event has not occurred, closing an unconnected prelaunched window station;
- connecting the user session associated with the first user identity with the primary window station is based on at least determining that a user login event has occurred;
- monitoring a time, event, and/or proximity condition associated with computing resource usage;
- based on at least the monitoring, setting a prelaunch trigger condition for a window station;
- the prelaunch manager comprises an ML model;
- the calendar event comprises a workday start;
- the calendar event comprises a scheduled appointment;
- the proximity condition comprises a connection event for a short range communication system;
- the proximity condition comprises detection of a user location within a predetermined region;
- the predetermined region is at least partially defined by a maximum distance from a reference location;
- the user endpoint lacks functionality to initiate the prelaunch of the primary window station;
- the user endpoint lacks functionality to initiate the prelaunch of the second window station or the third window station;
- the user endpoint is located remotely across a computer network from the prelaunch manager;
- the prelaunch manager is located on the user endpoint;
- the primary window station has a primary desktop;
- determining an occurrence of a second window prelaunch trigger condition;
- the second window station is associated with a first application;
- the second window station is associated with a user identity;
- the user identity associated with the second window station is the first user identity;
- the user identity associated with the second window station is a second user identity different than the first user identity;
- the second user identity has a different privilege level than the first user identity;
- determining an occurrence of a third window prelaunch trigger condition;
- the third window station is associated with a second application;
- the third window station is associated with a user identity;
- the user identity associated with the third window station is the first user identity;
- the user identity associated with the third window station is a second user identity different than the first user identity;
- the third user identity has a different privilege level than the first user identity;
- prelaunching the second window station and prelaunching the third window station occurs prior to the user login event;
- prelaunching the second window station and prelaunching the third window station occurs consecutively, such that prelaunching the third window station depends upon successfully prelaunching the second window station;
- the common computing apparatus hosts a plurality of additional VMs;
- the common computing apparatus hosts a plurality of VMs that are each hosting a plurality of window stations; and
- setting the prelaunch trigger condition for the window station comprises training the prelaunch manager based on at least the monitoring.

Exemplary Operating Environment

The present disclosure is operable with a computing device (computing apparatus) according to an embodiment shown as a functional block diagram 800 in FIG. 8. In an embodiment, components of a computing apparatus 818 may be implemented as part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the computing apparatus 818 to enable application software 821 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e.g., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823). Computer storage media are tangible, non-transitory, and are mutually exclusive to communication media.

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method of providing a window station, the computer-implemented method comprising:
    prior to a user login event associated with a first user identity at a user endpoint, determining, by a prelaunch manager, an occurrence of a primary window prelaunch trigger condition;
    based at least on determining the primary window prelaunch trigger condition, prelaunching, unconnected to a user session for the first user identity, a local primary window station for the first user identity on the user endpoint located remotely across a computer network from the prelaunch manager and prelaunching a remote primary window station for the first user identity on a server platform located remotely from the prelaunch manager and the user endpoint, wherein the local primary window station and the remote primary window station each contain one or more desktop objects, and wherein, upon prelaunching, the local primary window station and the remote primary window station are idle in a disconnected state; and
    based at least on an occurrence of the user login event associated with the first user identity at the user endpoint, connecting the user session with the local primary window station and the remote primary window station.

2. The computer-implemented method of claim 1, wherein the prelaunch trigger condition comprises a calendar event or a proximity condition.

3. The computer-implemented method of claim 1, further comprising:
    prelaunching, by the prelaunch manager and unconnected to the user session, a second window station within the remote primary window station;
    prelaunching, by the prelaunch manager and unconnected to the user session, a third window station within the remote primary window station; and
    switching an active window station among the remote primary window station, the second window station, and the third window station.

4. The computer-implemented method of claim 3, wherein prelaunching the second window station and prelaunching the third window station occurs concurrently, such that prelaunching the third window station does not depend upon successfully prelaunching the second window station.

5. The computer-implemented method of claim 3, wherein the remote primary window station, the second window station, and the third window station are all hosted by a same virtual machine (VM) on the server platform.

6. The computer-implemented method of claim 1, further comprising:
    determining whether the user login event associated with the first user identity has occurred prior to a timer expiration event; and
    based at least on determining that a user login event has not occurred, closing an unconnected prelaunched window station; and
    wherein connecting the user session with the local primary window station is based at least on determining that a user login event has occurred.

7. The computer-implemented method of claim 1, further comprising:
    monitoring a time, event, and/or proximity condition associated with computing resource usage; and
    based at least on the monitoring, setting a prelaunch trigger condition for a window station.

8. The computer-implemented method of claim 1, wherein the prelaunch manager comprises a machine learning (ML) model.

9. The computer-implemented method of claim 1, wherein the local primary window station is a securable object that is associated with a process, and wherein the local primary window station contains a clipboard, an atom table, and the one or more desktop objects.

10. A computer system comprising:
    a processor; and
    a non-transitory computer readable medium having stored thereon program code executable by the processor, the program code causing the processor to:
        prior to a user login event associated with a first user identity at a user endpoint, determine, by a prelaunch manager, an occurrence of a primary window prelaunch trigger condition;
        based at least on determining the primary window prelaunch trigger condition, prelaunch, unconnected to a user session for the first user identity, a local primary window station for the first user identity on the user endpoint located remotely across a computer network from the prelaunch manager and prelaunch a remote primary window station for the first user identity on a server platform located remotely from the prelaunch manager and the user endpoint, wherein the local primary window station and the remote primary window station each contain one or more desktop objects, and wherein, upon prelaunching, the local primary window station and the remote primary window station are idle in a disconnected state; and based at least on an occurrence of the user login event associated with the first user identity at the user endpoint, connect the user session with the local primary window station and the remote primary window station.

11. The computer system of claim 10, wherein the prelaunch trigger condition comprises a calendar event or a proximity condition.

12. The computer system of claim 10, wherein the program code is further operative to:

prelaunch, by the prelaunch manager and unconnected to the user session, a second window station within the remote primary window station;

prelaunch, by the prelaunch manager and unconnected to the user session, a third window station within the remote primary window station; and switch an active window station among the remote primary window station, the second window station, and the third window station.

13. The computer system of claim 12, wherein prelaunching the second window station and prelaunching the third window station occurs concurrently, such that prelaunching the third window station does not depend upon successfully prelaunching the second window station.

14. The computer system of claim 12, wherein the remote primary window station, the second window station, and the third window station are all hosted by a same virtual machine (VM) on the server platform.

15. The computer system of claim 10, wherein the program code is further operative to:

determining whether the user login event associated with the first user identity has occurred prior to a timer expiration event; and based at least on determining that a user login event has not occurred, closing an unconnected prelaunched window station; and wherein connecting the user session with the local primary window station is based at least on determining that a user login event has occurred.

16. The computer system of claim 10, wherein the program code is further operative to:

monitoring a time, event, and/or proximity condition associated with computing resource usage; and based at least on the monitoring, setting a prelaunch trigger condition for a window station.

17. The computer system of claim 10, wherein the prelaunch manager comprises a machine learning (ML) model.

18. A non-transitory computer storage medium having stored thereon program code executable by a processor, the program code embodying a method comprising:

prior to a user login event associated with a first user identity at a user endpoint, determining, by a prelaunch manager, an occurrence of a primary window prelaunch trigger condition;

based at least on determining the primary window prelaunch trigger condition, prelaunching, unconnected to a user session for the first user identity, a local primary window station for the first user identity on the user endpoint located remotely across a computer network from the prelaunch manager and prelaunching a remote primary window station for the first user identity on a server platform located remotely from the prelaunch manager and the user endpoint, wherein the local primary window station and the remote primary window station each contain one or more desktop objects, and wherein, upon prelaunching, the local primary window station and the remote primary window station are idle in a disconnected state; and based at least on an occurrence of the user login event associated with the first user identity at the user endpoint, connecting the user session associated with the first user identity with the local primary window station and the remote primary window station.

19. The computer storage medium of claim 18, wherein the program code method further comprises:

prelaunching, by the prelaunch manager and unconnected to the user session, a second window station within the remote primary window station;

prelaunching, by the prelaunch manager and unconnected to the user session, a third window station within the remote primary window station; and switching an active window station among the remote primary window station, the second window station, and the third window station.

20. The computer storage medium of claim 19, wherein prelaunching the second window station and prelaunching the third window station occurs concurrently, such that prelaunching the third window station does not depend upon successfully prelaunching the second window station.

* * * * *